(12) United States Patent
Boyd

(10) Patent No.: US 7,415,987 B2
(45) Date of Patent: *Aug. 26, 2008

(54) SAFETY SYSTEM HOSE

(75) Inventor: Richard C. Boyd, Fort Myers, FL (US)

(73) Assignee: Jeffrey Goldstein, Merrick, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/849,445

(22) Filed: Sep. 4, 2007

(65) Prior Publication Data

US 2007/0289630 A1 Dec. 20, 2007

Related U.S. Application Data

(63) Continuation of application No. 11/207,500, filed on Aug. 19, 2005, now Pat. No. 7,278,440.

(51) Int. Cl.
*F16K 17/36* (2006.01)
*F16K 17/40* (2006.01)
*F16L 37/30* (2006.01)

(52) U.S. Cl. ............... 137/68.14; 137/614.04

(58) Field of Classification Search ............... 137/68.14, 137/614.04
See application file for complete search history.

(56) References Cited

U.S. PATENT DOCUMENTS

| 3,630,214 | A | * | 12/1971 | Levering | 137/68.14 |
| 4,119,111 | A | * | 10/1978 | Allread | 137/68.14 |
| 4,872,471 | A | * | 10/1989 | Schneider | 137/68.14 |
| 5,357,998 | A | * | 10/1994 | Abrams | 137/614.04 |
| 6,260,569 | B1 | * | 7/2001 | Abrams | 137/68.14 |
| 6,513,556 | B1 | * | 2/2003 | Nimberger et al. | 141/387 |
| 6,546,947 | B2 | * | 4/2003 | Abrams | 137/68.14 |
| 6,722,405 | B2 | * | 4/2004 | Cessac et al. | 137/68.14 |
| 7,278,440 | B2 | * | 10/2007 | Boyd | 137/68.14 |

* cited by examiner

*Primary Examiner*—John Rivell
(74) *Attorney, Agent, or Firm*—Jennifer Meredith, Esq.; Meredith & Keyhani, PLLC

(57) ABSTRACT

A safety system for a fluid conduit having: a hose; a first housing connected to the hose with an internal cavity having a first connection point and a first check ball opening cavity; a second housing connected to the hose with an internal cavity having a second connection point and a second check ball opening cavity; a perforated retention tube positioned longitudinally within the hose and in communication with the first connection point and the second connection point; a first check device contained within the first check ball opening cavity and interposed between the perforated retention tube and the first check ball opening cavity; and optionally a second check device contained within the second check ball opening cavity and interposed between the perforated retention tube and the second check ball opening cavity.

20 Claims, 4 Drawing Sheets

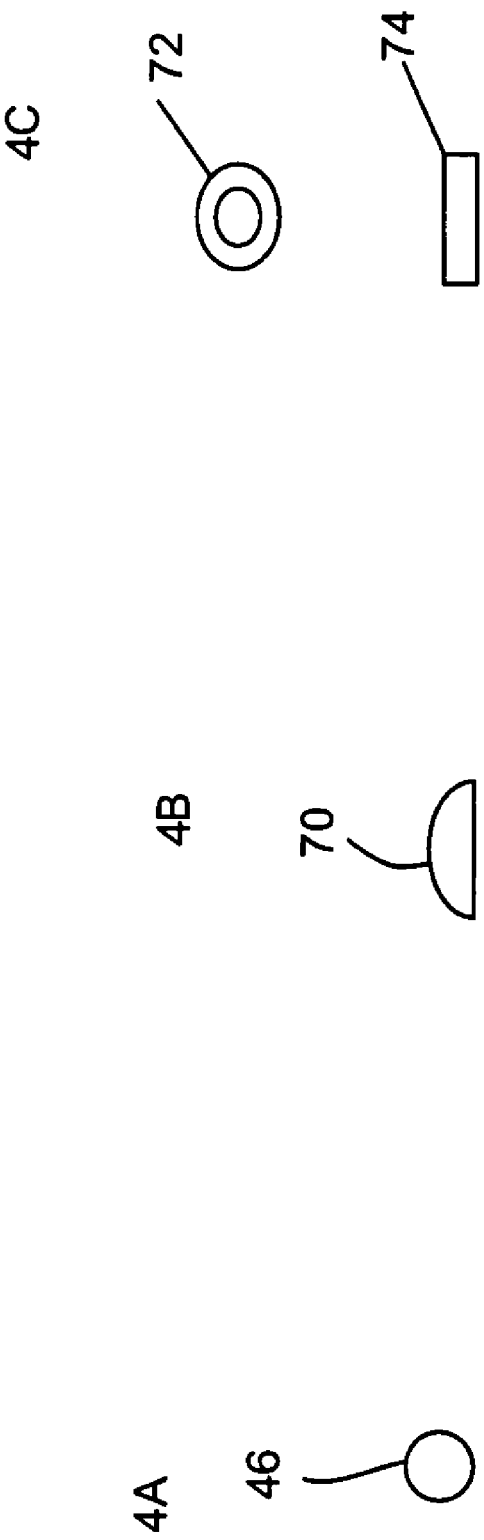

SAFETY SYSTEM HOSE

This application is a continuing application of application Ser. No. 11/207,500 applied for on Aug. 19, 2005 now U.S. Pat. No. 7,278,440.

BACKGROUND OF THE INVENTION

This invention relates generally to transfer hose, and more particularly a safety system hose for a fluid conduit. Transfer hose are often used to deliver compressed gases such as hydrogen, oxygen and propane. During use of the hose, the transfer hose may inadvertently become severed, split or rupture. Most hoses, upon failure, will allow product to continue to be expelled until manually shut-off. Another problem, is whipping of the hose which can cause injury. During the failure, the hose may also be leaking hazardous fumes into the surrounding environment. The fumes may cause sickness or even be explosive.

One prior art attempt to solve the problem uses an attachment of an exterior cable to the length of the hose. This does not, however, stop the flow of product. Other devices may eliminate whipping and also check the flow of product. However, their design typically may also prematurely check the flow during normal operation.

There is a need within the art to provide a hose that stops the flow of product and eliminates whipping without prematurely checking flow during normal operation.

SUMMARY OF THE INVENTION

The present invention relates generally to safety systems for fluid conduits, and more specifically to systems which, in the event of failure stops the flow of product and eliminates whipping without prematurely checking flow during normal operation.

According to a first embodiment, a safety system for a fluid conduit is disclosed comprising: a hose having a first and second end; a first housing connected to the first end of the hose, the first housing having first and second openings and an internal cavity, the internal cavity having a first connection point and a first check ball opening cavity; a second housing connected to the second end of the hose, the second housing having first and second openings and an internal cavity, the internal cavity having a second connection point and a second check ball opening cavity; a perforated retention tube having first and second ends, the perforated tube being smaller than the hose and positioned longitudinally within the hose, the first end of the perforated retention tube being in communication with the first connection point, the second end of the perforated retention tube being in communication the second connection point; a first check device contained within the first check ball opening cavity and interposed between the perforated retention tube and the first check ball opening cavity; and a second check device contained within the second check ball opening cavity and interposed between the perforated retention tube and the second check ball opening cavity.

According to another embodiment, a safety system for a fluid conduit is disclosed comprising: a hose having a first and second end; a first housing connected to the first end of the hose, the first housing having first and second openings and an internal cavity, the internal cavity having a first connection point and a first check ball opening cavity; a second housing connected to the second end of the hose, the second housing having first and second openings and an internal cavity, the internal cavity having a second connection point and a second check ball opening cavity; a perforated retention tube having first and second ends, the perforated tube being smaller than the hose and positioned longitudinally within the hose, the first end of the perforated retention tube being in communication with the first connection point, the second end of the perforated retention tube being in communication with the second connection point; a first tube retainer circumferentially surrounding the perforated retention tube and between the internal cavity and the first connection point; a second tube retainer circumferentially surrounding the perforated retention tube and between the internal cavity and the second connection point; a first check device contained within the first check ball opening cavity and interposed between the perforated retention tube and the first check ball opening cavity; and a second check device contained within the second check ball opening cavity and interposed between the perforated retention tube and the second check ball opening cavity.

According to yet another embodiment, A safety system for a fluid conduit is disclosed comprising: a hose having a first and second end; a first housing connected to the first end of the hose, the first housing having first and second openings and an internal cavity, the internal cavity having a first connection point and a first check ball opening cavity, wherein the first check ball opening cavity is further comprised of a first check device receipt cavity; a second housing connected to the second end of the hose, the second housing having first and second openings and an internal cavity, the internal cavity having a second connection point and a second check ball opening cavity, wherein the second check ball opening cavity is further comprised of a second check device receipt cavity; a perforated retention tube having first and second ends, the perforated tube being smaller than the hose and positioned longitudinally within the hose, the first end of the perforated retention tube being in communication with the first connection point, the second end of the perforated retention tube being in communication with the second connection point; a first tube retainer circumferentially surrounding the perforated retention tube and between the internal cavity and the first connection point; a second tube retainer circumferentially surrounding the perforated retention tube and between the internal cavity and the second connection point; a first check device contained within the first check ball opening cavity and interposed between the perforated retention tube and the first check ball opening cavity; and a second check device contained within the second check ball opening cavity and interposed between the perforated retention tube and the second check ball opening cavity.

This summary is not to be taken in a limiting sense, but is made merely for the purpose of illustrating the general principles of the invention, since the scope of the invention is best defined by the appended claims.

BRIEF DESCRIPTION OF THE DRAWINGS

FIGS. 4A-4C depict check devices according the present invention.

DETAILED DESCRIPTION OF THE INVENTION

Figure 1:
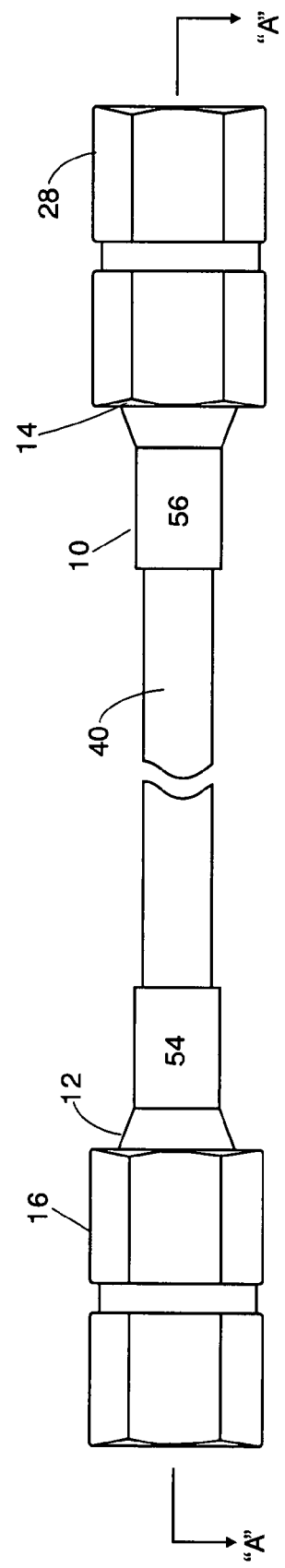
FIG. 1 depicts a side view according to the present invention.
Figure 2:
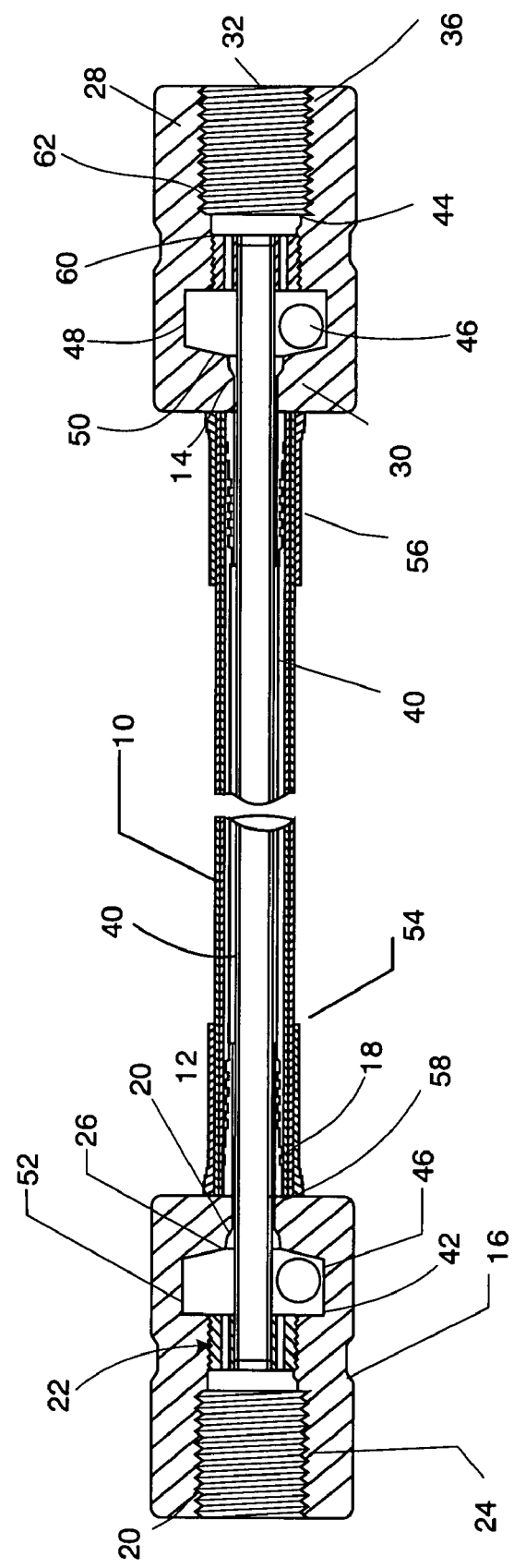
FIG. 2 depicts a cutaway according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

As described herein and with reference to FIGS. 1-4, the present invention provides a safety system for a fluid conduit comprising: a hose (10) having a first (12) and second end (14); a first housing (16) connected to the first end (12) of the hose (10), the first housing (16) having first (18) and second openings (20) and an internal cavity (22), the internal cavity (22) having a first connection point (24) and a first check ball opening cavity (26), wherein the first check ball opening cavity is further comprised of a first check device receipt cavity (50); a second housing (28) connected to the second end (14) of the hose (10), the second housing (14) having first (30) and second (32) openings and an internal cavity (34), the internal cavity (34) having a second connection point (36) and a second check ball opening cavity (38), wherein the second check ball opening cavity is further comprised of a second check device receipt cavity (50); a perforated retention tube (40) having first (42) and second (44) ends, the perforated tube being smaller than the hose (10) and positioned longitudinally within the hose (10), the first end (42) of the perforated retention tube being in communication with the first connection point (24), the second end (44) of the perforated retention tube being in communication with the second connection point (36); a first check device (46) contained within the first check ball opening cavity (26) and interposed between the perforated retention tube (40) and said first check ball opening cavity (26); and a second check device (46) contained within the second check ball opening cavity (48) and interposed between the perforated retention tube (40) and the second check ball opening cavity (48).

The hose (10) may be made of stainless steel, bronze, monel, incol or any other suitable material. It may be flexible or rigid. The perforated retention tube (40) may be made of Teflon™. The check device, if a check ball, may be made of brass.

According to a preferred embodiment, there may be a first tube retainer (52) circumferentially surrounding the perforated retention tube (40) and between the internal cavity (22) and the first connection point (24); a second tube retainer (60) circumferentially surrounding the perforated retention tube (40) and between the internal cavity (48) and the second connection point (36).

There may also be a first ferrule (54) for sealing the first housing (16) to the first end (12) of the hose and a second ferrule (56) for sealing the second housing (28) to the second end (14) of the hose (10).

During normal operation either the first connection point (24) or the second connection point (36) may be attached to a product source. This may typically be hydrogen, oxygen or propane, but may include any fluid and intended for use with a wide variety of fluids and/or gases. The product is allowed to flow freely through the hose (10) and the perforated retention tube (40). The perforated retention tube (40) may be held in place by the first tube retainer (52) in the first housing (16) and the second tube retainer (60) in the second housing (28). However, it is envisioned that the perforated retention tube (40) may also be held in place a number of different ways including being directly attached to the first connection point (24) and/or second connection point (36). The check device (e.g. 46, 70, 72, 74) is held off to the side by entrapment along the outside of the perforated retention tube 40.

Figure 3:
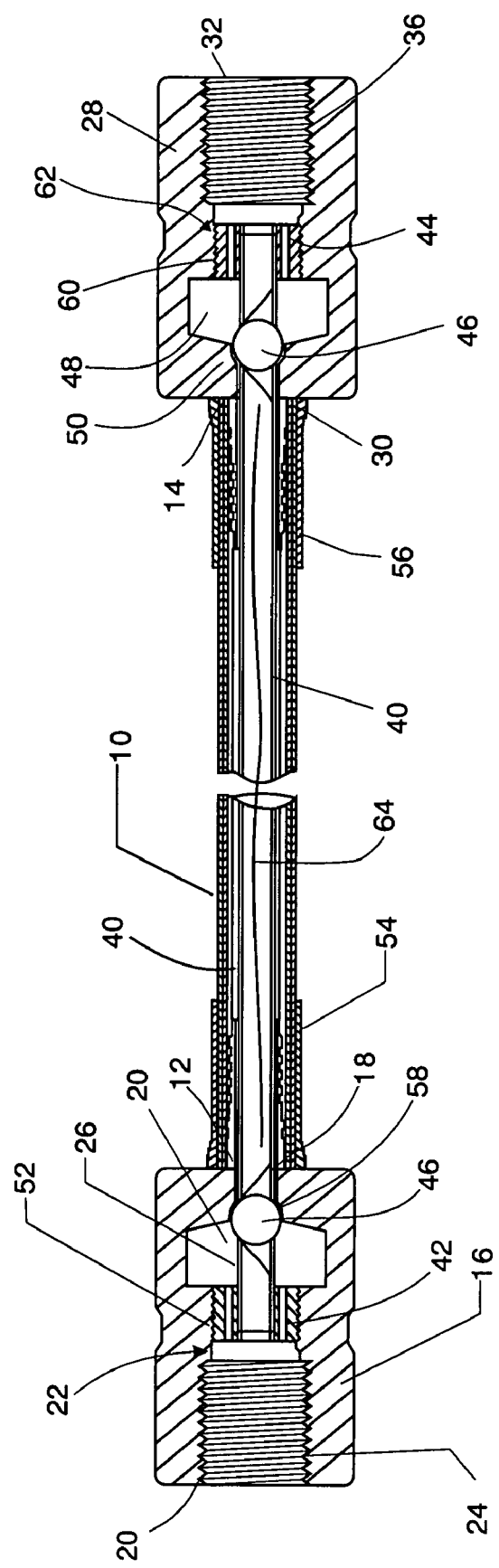
FIG. 3 depicts a cutaway according to the present invention.

FIG. 3 depicts the system in the event of a failure. If the hose should fail, the perforated retention tube (40) will pull back and the check device (46) will seat in the product stream (64), stopping the flow of the product and preventing whipping. As can be seen, where the first check ball opening cavity (26) has a first check device receipt cavity (58), the check device (46) will sit in the check device receipt cavity (58) in the event of failure. Where the second check ball opening cavity (48) has a second check device receipt cavity (50), the check device (46) will sit in the check device receipt cavity (50) in the event of failure.

The first check device and the second check device may be the same or different within any one hose. As shown in FIGS. 4A-4C, they may be a check ball, half check ball or flat plate with an o-ring seal.

This description is not to be taken in a limiting sense, but is made merely for the purpose of illustrating the general principles of the invention, since the scope of the invention is best defined by the appended claims.

I claim:

1. A safety system for a fluid conduit comprising:
    a hose having a first and second end;
    a first housing connected to said first end of said hose, said first housing having first and second openings and an internal cavity, said internal cavity having a first connection point and a first check ball opening cavity;
    a second housing connected to said second end of said hose, said second housing having first and second openings and an internal cavity, said internal cavity having a second connection point and a second check ball opening cavity;
    a perforated retention tube having first and second ends, said perforated tube being smaller than said hose and positioned longitudinally within said hose, said first end of said perforated retention tube being in communication with said first connection point, said second end of said perforated retention tube being in communication with said second connection point;
    a first check ball device contained within said first check ball opening cavity and interposed between said perforated retention tube and said first check ball opening cavity; and
    a second check ball device contained within said second check ball opening cavity and interposed between said perforated retention tube and said second check ball opening cavity.

2. A safety system as in claim 1, wherein said first check ball opening cavity is further comprised of a first check device receipt cavity.

3. A safety system as in claim 1, wherein said second check ball opening cavity is further comprised of a second check device receipt cavity.

4. A safety system as in claim 1, wherein said first check device is selected from the group consisting of a check ball or half check ball.

5. A safety system as in claim 1, wherein said second check ball device is selected from the group consisting of a check ball or half check ball.

6. A safety system as in claim 1, further comprising a first ferrule for sealing said first housing to said first end of said hose.

7. A safety system as in claim 1, further comprising a second ferrule for sealing said second housing to said second end of said hose.

8. A safety system for a fluid conduit comprising:

a hose having a first and second end;

a first housing connected to said first end of said hose, said first housing having first and second openings and an internal cavity, said internal cavity having a first connection point and a first check ball opening cavity, said first check ball opening cavity further comprising a first check device receipt cavity;

a second housing connected to said second end of said hose, said second housing having first and second openings and an internal cavity, said internal cavity having a second connection point and a second check ball opening cavity;

a perforated retention tube having first and second ends, said perforated tube being smaller than said hose and positioned longitudinally within said hose, said first end of said perforated retention tube being in communication with said first connection point, said second end of said perforated retention tube being in communication with said second connection point;

a first tube retainer circumferentially surrounding said perforated retention tube and between said internal cavity and said first connection point;

a second tube retainer circumferentially surrounding said perforated retention tube and between said internal cavity and said second connection point;

a first check ball device contained within said first check ball opening cavity and interposed between said perforated retention tube and said first check ball opening cavity.

9. A safety system as in claim 8, further comprising a second check ball device contained within said second check ball opening cavity and interposed between said perforated retention tube and said second check ball opening cavity.

10. A safety system as in claim 8, wherein said second check ball opening cavity is further comprised of a second check device receipt cavity.

11. A safety system as in claim 8, wherein said first check device is selected from the group consisting of a check ball or half check ball.

12. A safety system as in claim 9, wherein said second check ball device is selected from the group consisting of a check ball or half check ball.

13. A safety system as in claim 8, further comprising a first ferrule for sealing said first housing to said first end of said hose.

14. A safety system as in claim 8, further comprising a second ferrule for sealing said second housing to said second end of said hose.

15. A safety system for a fluid conduit comprising:

a hose having a first and second end;

a first housing connected to said first end of said hose, said first housing having first and second openings and an internal cavity, said internal cavity having a first connection point and a first check ball opening cavity, wherein said first check ball opening cavity is further comprised of a first check device receipt cavity;

a second housing connected to said second end of said hose, said second housing having first and second openings and an internal cavity, said internal cavity having a second connection point and a second check ball opening cavity, wherein said second check ball opening cavity is further comprised of a second check device receipt cavity;

a perforated retention tube having first and second ends, said perforated tube being smaller than said hose and positioned longitudinally within said hose, said first end of said perforated retention tube being in communication with said first connection point, said second end of said perforated retention tube being in communication with said second connection point;

a first tube retainer circumferentially surrounding said perforated retention tube and between said internal cavity and said first connection point;

a second tube retainer circumferentially surrounding said perforated retention tube and between said internal cavity and said second connection point;

a first check ball device contained within said first check ball opening cavity and interposed between said perforated retention tube and said first check ball opening cavity.

16. A safety system as in claim 15, further comprising a second check ball device contained within said second check ball opening cavity and interposed between said perforated retention tube and said second check ball opening cavity.

17. A safety system as in claim 15, wherein said first check device is selected from the group consisting of a check ball or half check ball.

18. A safety system as in claim 16, wherein said second check ball device is selected from the group consisting of a check ball or half check ball.

19. A safety system as in claim 15, further comprising a first ferrule for sealing said first housing to said first end of said hose.

20. A safety system as in claim 15, further comprising a second ferrule for sealing said second housing to said second end of said hose.

* * * * *